United States Patent [19]

Bianco

[11] Patent Number: 5,047,614
[45] Date of Patent: Sep. 10, 1991

[54] METHOD AND APPARATUS FOR COMPUTER-AIDED SHOPPING

[76] Inventor: James S. Bianco, 217 Brainard Rd., Enfield, Conn. 06082

[21] Appl. No.: 391,733

[22] Filed: Aug. 8, 1989

Related U.S. Application Data

[63] Continuation-in-part of Ser. No. 300,352, Jan. 23, 1989, abandoned.

[51] Int. Cl.⁵ .................... G06F 15/24; G06F 15/26
[52] U.S. Cl. .................................. 235/385; 235/382; 235/462; 235/472
[58] Field of Search ............... 235/385, 382, 462, 472, 235/383; 379/95

[56] References Cited

U.S. PATENT DOCUMENTS

| | | | |
|---|---|---|---|
| 4,471,218 | 9/1984 | Culp | 235/462 |
| 4,648,037 | 3/1987 | Valentino | 235/379 |
| 4,654,482 | 3/1987 | DeAngelis | 379/95 |
| 4,780,599 | 10/1988 | Baus | 235/385 |
| 4,908,500 | 3/1990 | Baumberger | 235/472 |
| 4,916,441 | 4/1990 | Gombrich | 235/382 |

Primary Examiner—Harold Pitts
Attorney, Agent, or Firm—John H. Crozier

[57] ABSTRACT

In a preferred embodiment, a method and means to aid shopping which includes the use by a consumer of a portable bar code scanner having an electronic memory. The consumer enters desired items into the memory by scanning bar codes on, for example, containers, coupons, advertisements, and pamphlets furnished by a store. The memory is then read by a store terminal which may compile a printed shopping list and/or may transmit the order to a warehouse environment for manual and/or automatic order picking. The memory may be read by the store terminal over a telephone line via a modem.

17 Claims, 5 Drawing Sheets

METHOD AND APPARATUS FOR COMPUTER-AIDED SHOPPING

This is a continuation-in-part of co-pending application Ser. No. 300,352 filed on Jan. 23, 1989, now abandoned.

BACKGROUND OF THE INVENTION

1. Field of the Invention.

The present invention relates to shopping by consumers generally and, more particularly, to a novel method and apparatus for computer-aided shopping which provides for greater efficiency both for the consumer and for the supplier of consumer goods.

2. Background Art.

The problems associated with consumer shopping are well known. To take the case of grocery shopping, for example, it is necessary for the consumer to make a written list, or memorize a list, of items which the consumer wishes to purchase during the consumer's next trip to the grocery store. The events which may prompt addition of an item to the list include finishing a container of the item, receiving a discount coupon for the item, and reading an advertisement for the item. When the consumer is shopping at the grocery store, it is necessary to refer to the list which, when written, may be difficult to follow, since the items may not be listed in the order in which they are stocked on the store shelves. If a specific item is not available, the consumer may have to spend some time deciding which substitute item is most nearly identical to the desired item. If the consumer has a coupon for an item, it is necessary for the comsumer to remember to present the coupon at the check-out counter.

Consumers who are confined to their homes have a special problem in that they must either telephone orders for goods to store or give a list to other persons to shop for them. The former case is relatively inefficient in that what may be a long list of items must be taken down by the store personnel. In the latter case, the lists given to the other persons may lack sufficient detail for the consumers to receive exactly the items they desire.

From the point of view of the grocery store, the problems of the consumer cause shopping to be somewhat inefficient and lead to unnecessary congestion in the store. Also, the fact that supplies of groceries on the shelves must be sufficiently large that a relatively large number of consumers can manually select the items without creating frequent outages means that more shelf space is necessary than would be the case if the bulk of the items could be furnished to the consumer without manual picking thereof by the consumer.

These, and numerous other problems, cause shopping to be less efficient than would be desired by either the shopper or the grocery store.

Accordingly, it is a principal object of the present invention to provide a method and means for aiding shopping which eliminate many of the problems associated with shopping by consumers.

It is another object of the invention to provide such method and means that help insure that consumers obtain the desired items for which they are shopping.

It is an additonal object of the invention to provide such method and means that allow remote shopping by consumers.

It is a further object of the invention to provide such method and means that allow automatic order picking.

Other objects of the present invention, as well as particular features and advantages thereof, will, in part, be apparent and will, in part, be obvious from the following description and the accompanying drawing figures.

SUMMARY OF THE INVENTION

The present invention accomplishes the above objects, among others, by providing, in a preferred embodiment, a method and means to aid shopping which includes the use by a consumer in the consumer's home of a portable bar code scanner having an electronic memory. The consumer enters desired items into the memory by scanning bar codes on, for example, containers, coupons, advertisements, and pamphlets furnished by a store. The memory is then read by a store terminal which may compile a printed shopping list and/or may transmit the order to a warehouse environment for manual and/or automatic order picking. The memory may be read by the store terminal over a telephone line via a modem.

DETAILED DESCRIPTION OF THE PREFERRED EMBODIMENTS

Figures 1, 2:
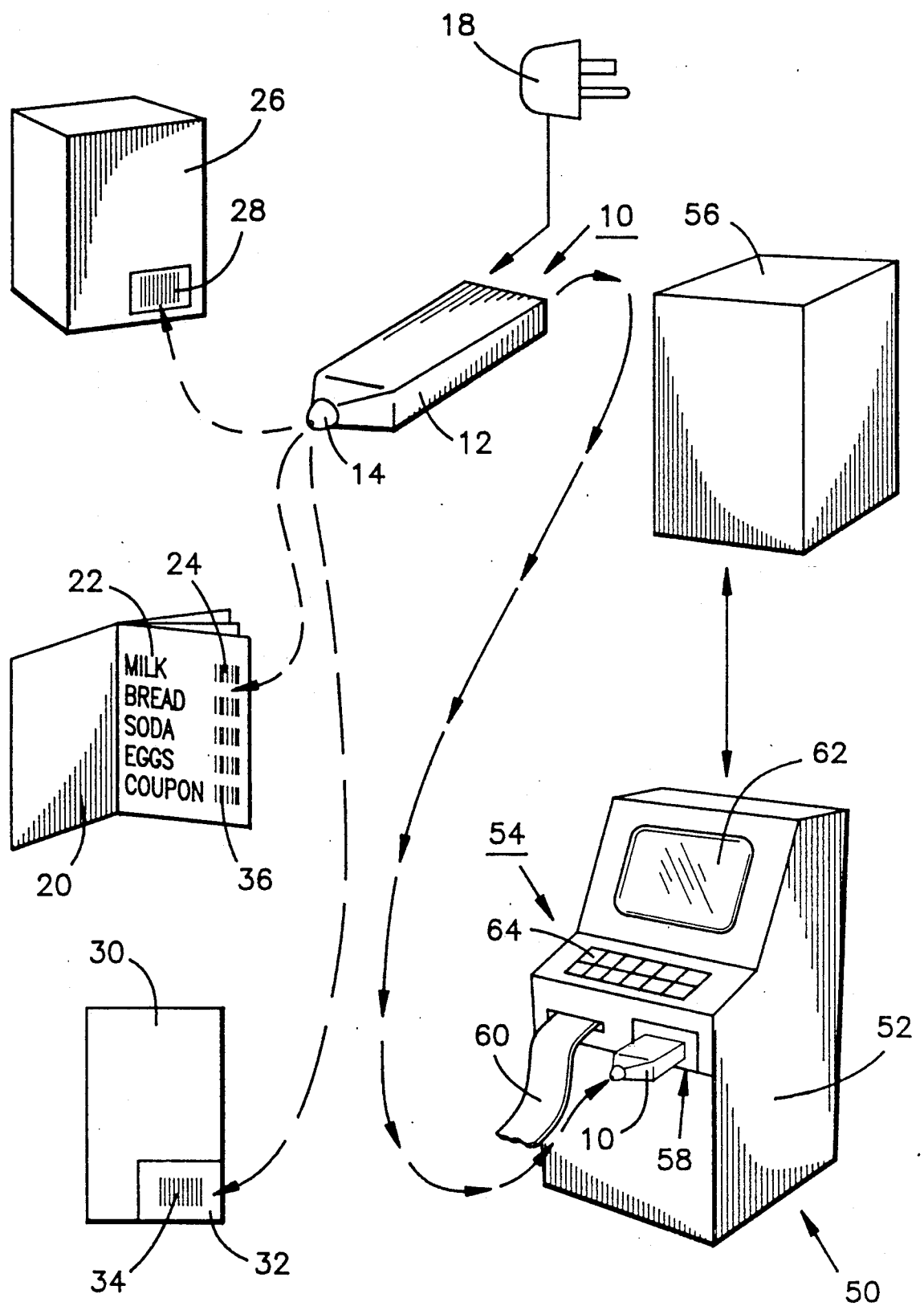
FIG. 1 is a schematic diagram indicating how a consumer may enter information representing desired items into an electronic memory.
FIG. 2 is a perspective view of a kiosk in a store, said kiosk including a terminal with which to compile a shopping list

Referring now to the Drawing, in which like or similar elements are given consistent identifying numerals throughout the various drawing figures, FIG. 1 illustrates how the method and apparatus of the present invention may be used by a consumer in the consumer's home or other location. The consumer is provided by a seller of consumer goods, such as groceries, with a portable hand-held bar code reading terminal, generally indicated by the reference numeral 10 which includes a body 12, and an optical sensor 14.

Figure 4:
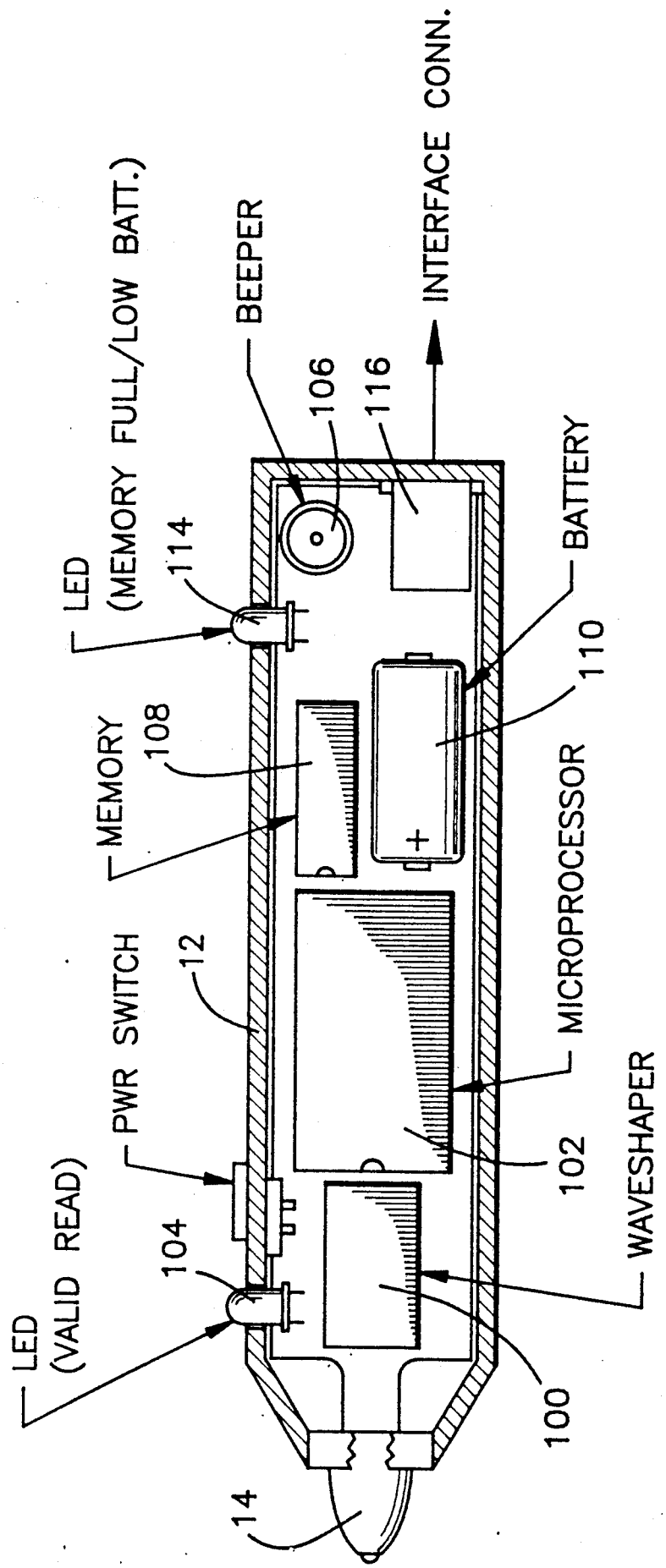
FIG. 4 is side elevation view, partially in crosssection, showing the internal components of a bar code reading terminal which may be employed with the present invention.
Figure 5:
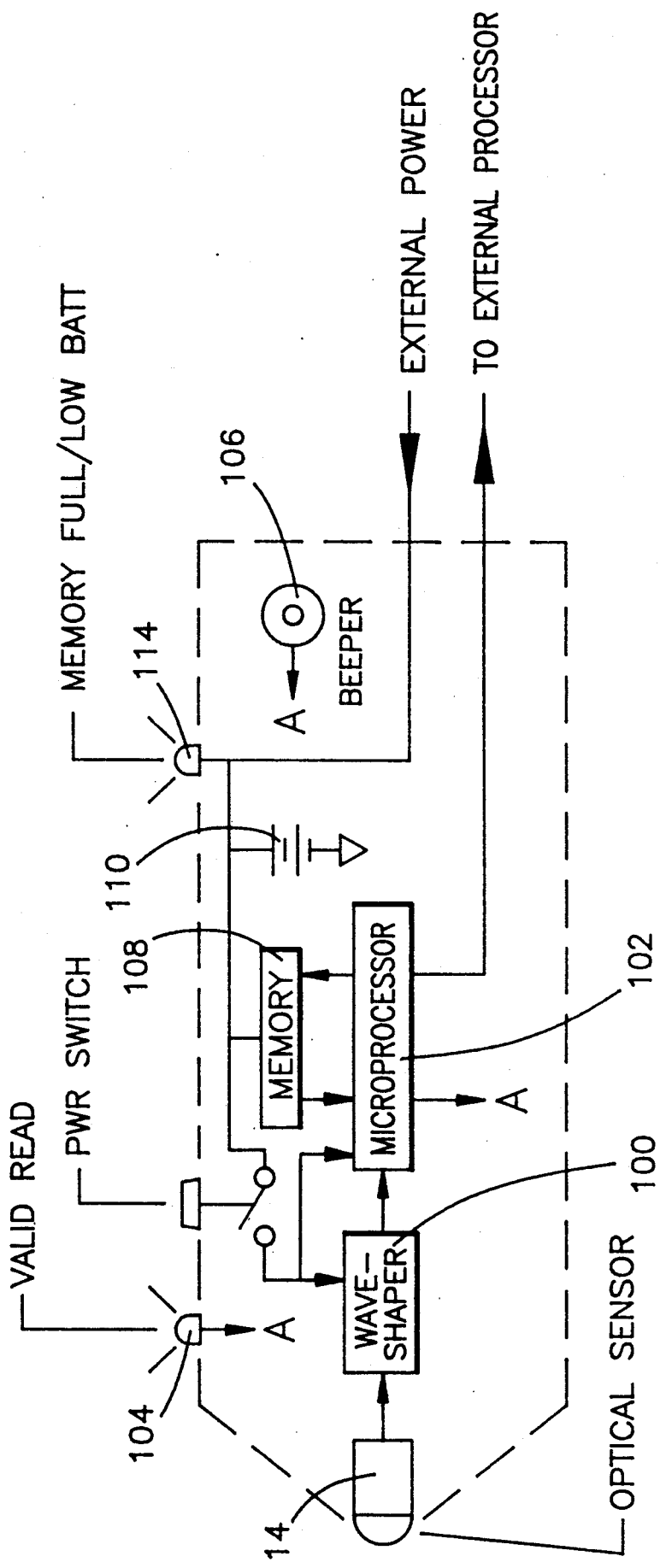
FIG. 5 is a schematic diagram of the interconnecting electrical circuitry of the components of FIG. 4.

Referring now to FIGS. 4 and 5, it can be seen that internally of terminal 10 is a wave-shaper 100 connected to optical sensor 14 to receive analog information from the sensor, convert the analog information to digital information, and to pass the digital information to a microprocessor 102. Microprocessor 102 reads the digital information and when a valid bar code is read, provides a signal to activate LED 104 and beeper 106 to alert the consumer that the bar code has been read. Microprocessor 102 also stores the bar code information in a non-volatile memory 108. The internal components of terminal 10 are powered by a battery 110 which may be charged from an external power source through adapter 18 (FIG. 1). Battery 110 is connected to memory 108 at all times so that the memory is maintained; however, connections to waveshaper 100 and microprocessor 102 are through power switch 112 which is moved to its "on" position only when the consumer is entering information. A "full" condition of memory 108 is indicated by LED 114 which also lights to indicate a "low" condition of battery 110. An interface connection 116 is provided so that memory 108 can be read by an external processor as is described below.

Microprocessor 102 is programmed to recognize standard bar code symbologies such as the Universal Product Code and Code 39 which are commonly used on almost all consumer products.

Terminal 10 may used to store information representing desired shopping items in a number of ways. First, the consumer may be provided with a pamphlet 20 comprising lists of a number of frequently purchased items, by brand or generic names, such as listing 22 for "MILK". Opposite listing 22 is a unique bar code 24 which corresponds to listing 22. The consumer enters the item represented by listing 22 into the memory of terminal 10 by scanning bar code 24. The consumer enters additional items from pamphlet 20 in the same manner. The pamphlet may comprise lists of only frequently purchased items, such as pamphlet 20, or it may be a comprehensive listing of the products available in the store, thus permitting total "home shopping".

A second method of entering desired items is to scan the bar code on the container of the item after the item has been consumed. For example, before discarding empty box 26, the consumer would scan bar code 28 on the box with terminal 10. This would add the item to the shopping list in the memory of terminal 10.

A third source of data for entering desired items to the memory of terminal 10 is advertisement 30 which includes a coupon 32 having a bar code 34. In this case, the consumer would scan bar code 36 on pamphlet 20 opposite "COUPON" then bar code 34 on coupon 32. This would add the item being advertised to the memory and also tag that entry with a note that the consumer has a coupon. This method may be used with coupons received apart from advertisements, as well.

When the consumer is ready to shop, the consumer takes terminal 10 to the store in which there is provided a kiosk, generally indicated by the reference numeral 50 on FIG. 2. Kiosk 50 includes a housing 52 which contains a customer computer terminal for customer use, generally indicated by the reference numeral 54, which may be one of several such terminals connected to a host computer 56. Host computer 56 may be the store's existing inventory control computer. Terminal 54 has a port 58 into which the customer inserts portable bar code reading terminal 10. Terminal 54 reads the memory in terminal 10 and provides a printed shopping list 60 of the items which have been previously entered into the memory of terminal 10. Shopping list 60 includes quantity, location, and price and is arranged so that the items listed thereon are sequenced such that the customer will take a preferred route through the store when picking the items. Shopping list 60 also notes for which items the customer has coupons. After shopping list 60 has been printed, the memory in portable terminal 10 is cleared.

Terminal 54 may also be provided with a screen 62 which may display the items and a keyboard 64 which the customer may use to revise the list of items before shopping list 60 is printed.

If the customer has entered a generic name in terminal 10, for example "BREAD", shopping list 60 and/or screen 62 may provide "helpful hints" such as which brands of bread are specially priced. Also, if the customer has selected, for example, a 12-ounce box of a product, shopping list 60 and/or screen 62 may note that buying a 24-ounce box provides better value to the customer.

Figure 3:
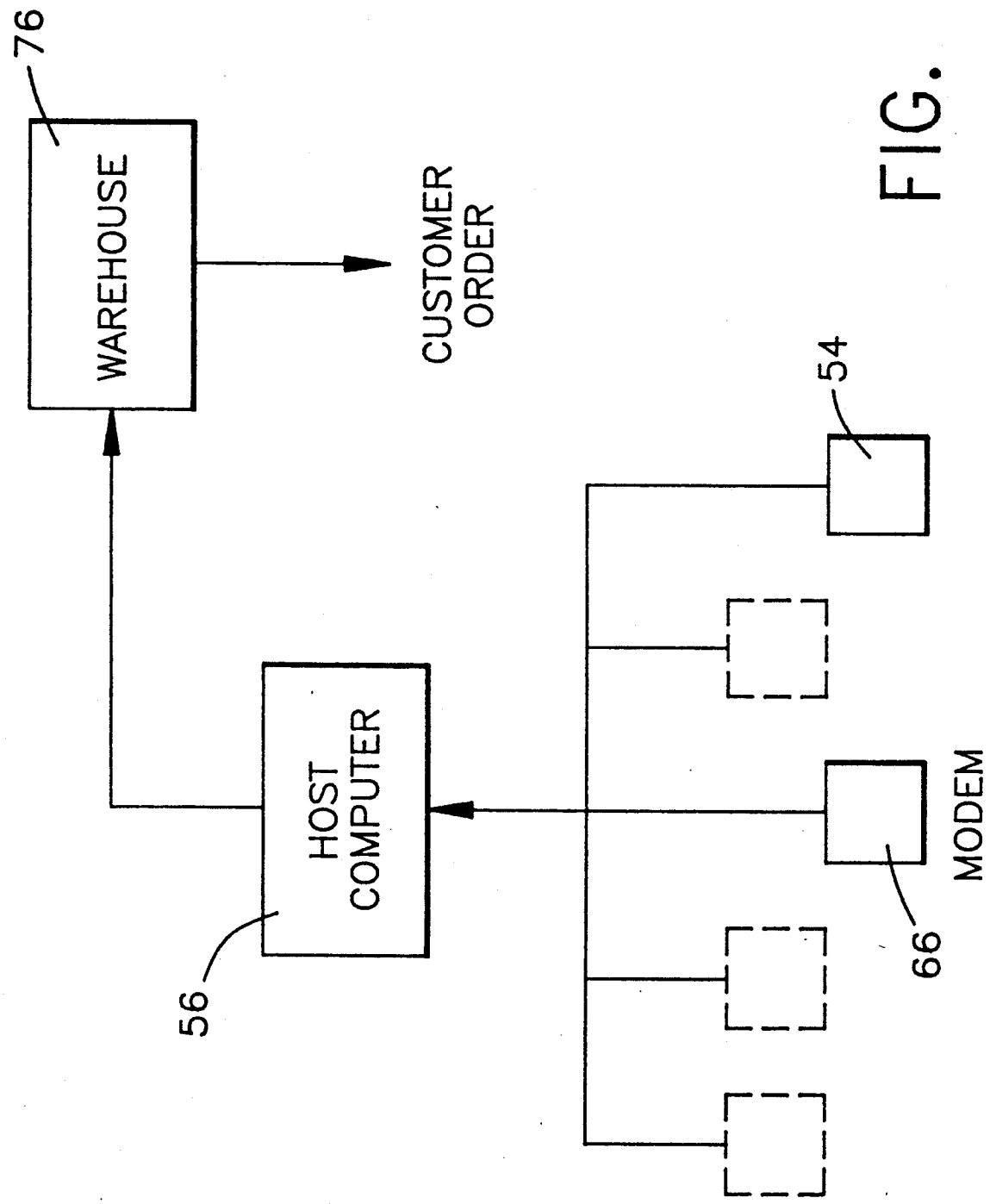
FIG. 3 is a schematic diagram indicating how the present invention may be used for automatic order picking.

The present invention also is well suited for the further embodiment shown on FIG. 3. Here, host computer 56 transmits the list of items to a warehouse 76 where the customer's order is picked manually and/or automatically and then moved to a pick-up point. The order may be pre-priced, so that it does not have to be unloaded at a check-out counter. Such an arrangement permits the store to greatly reduce the quantity of goods that must by displayed on shelves occupying relatively costly floor space by having a large proportion of the total store inventory housed in a relatively inexpensive warehouse environment. Some smaller quantities of goods, especially speciality items, could be displayed on conventional store shelves for customer browsing and to encourage impulse buying. Additionally, this arrangement permits the store to display a greater number of different items in a smaller space.

Remote shopping by comsumers confined to their homes, and others similarly situated, may be accomplished by such consumers transmitting their shopping lists to the store via a modem for delivery by the store or for pick-up by others. The use of a modem with a "touch tone" telephone permits a further extension of the method of the present invention. In that case, the consumer's shopping list is first transmitted to the store in coded form and then the list may be "read" back to the consumer via electronic voice response. The consumer may then use various buttons on the telephone to confirm or change individual items and/or convey other information such as whether the order is to be delivered to the consumer, or is to be held for pick-up, and at what time, etc.

A further advantage of the invention is that another person may shop for the consumer and the consumer can obtain the exact items which are desired.

It is also within the intent of the present invention that shopping list 60 be printed by the consumer in the consumer's home, either by portable terminal 10 or through use of other, conventional computer/printer equipment which the consumer may have.

Another advantage of the invention is that the store can develop certain information about its customers. When assigning terminal 10 to a customer, the store may require an information questionnaire be completed which might include certain information about the consumer's household, such as income and number of children. This information together with that derived from the consumer's shopping lists can be used to develop customer profiles which may be used, for example, for special promotions directed to certain consumers.

A further advantage of the invention is that the information questionnaire can be used to elicit information about consumer preferences that can be used to assist the consumer when shopping. For example, the consumer may indicate a preference for low-salt products. Then, when the consumer uses kiosk 50, shopping list 60 and/or screen 62 may indicate to the consumer that a high-salt product has been selected and may indicate a substitute that would fit the previously indicated preference.

Terminal 10 may also have a pre-programmed check cashing level, so that a separate a check cashing card is not required, thus further saving time of both the consumer and the store.

Figure 6:
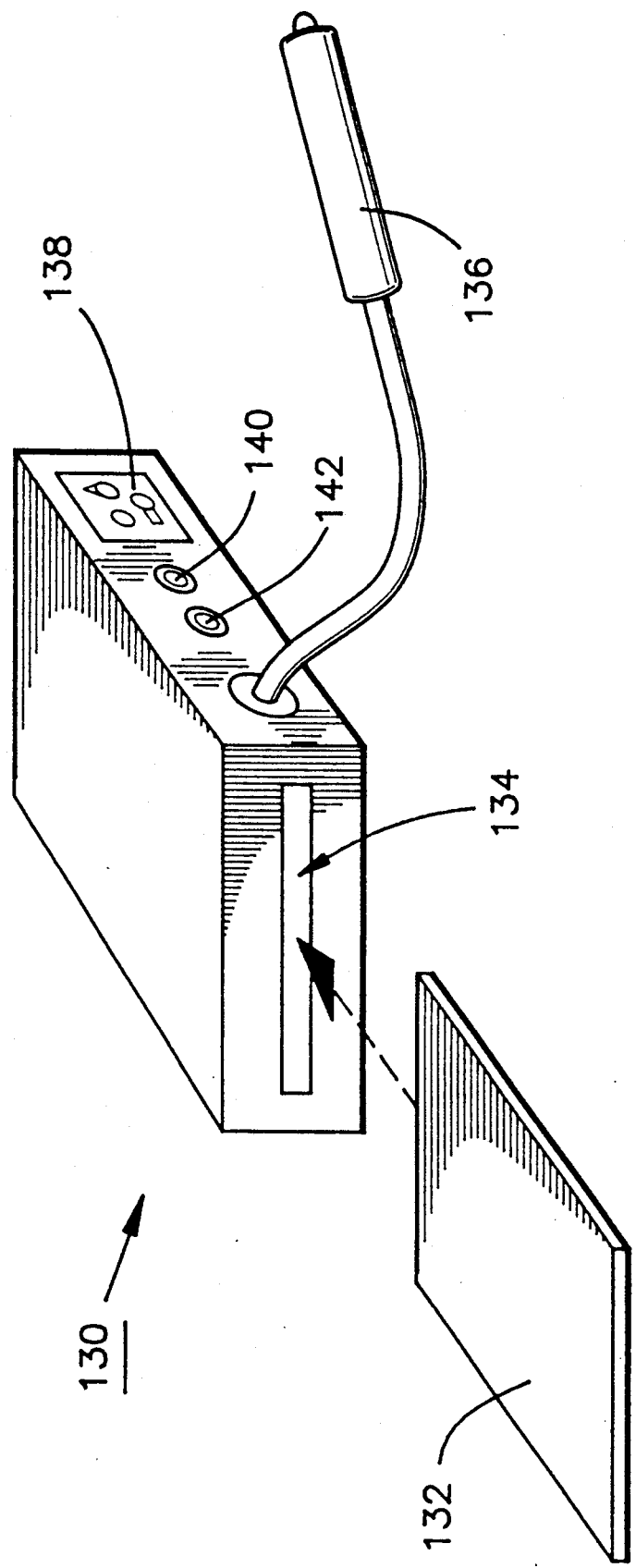
FIG. 6 is a schematic diagram of an alternative to the embodiment of the bar code reading terminal of the invention shown on FIGS. 1, 2, 4, and 5.

FIG. 6 indicates schematically an alternative to terminal 10 of FIGS. 1, 2, 4, and 5, namely, a bar code reading terminal, generally indicated by the reference numeral 130. Terminal 130 is not intended to be transported to a store as was terminal 10, but instead, terminal 130 remains in the consumer's home and only the memory, a "smart card" 132 in which the customer's input data is recorded, is taken to the store. This arrangement permits the relatively expensive terminal to remain in a safe environment, while if the card were lost, it would represent a relatively inexpensive loss. A further advantage is that two or three smart cards 132 may be provided so that additional data may be recorded while one of the cards has been taken to the store.

Smart card 132 is inserted into a slot 134 defined in terminal 130 where it may be left while data is being accumulated. An electronic memory embedded in the card stores the data. The operation of terminal 132 is the same as described for terminal 10 above, except for the removable memory, in the form of smart card 132, and for the use of a separate bar code reading wand 136 attached to terminal 130. Provided on terminal 130 may be a power jack 138 for charging of an internal battery and, if the terminal includes an internal modem, jacks 140 and 142 for connection to the consumer's telephone line and a telephone (neither shown).

The use of smart card 132 facilitates another variation of the method of the invention, that of providing kiosk 50 (FIG. 2) in a "drive-through" embodiment. In that case, a consumer could, for example, drive to the kiosk while driving to work in the morning, insert the smart card in the kiosk, receive a printed receipt, and then return in the evening to pick up the pre-bagged order. Of course, terminal 10 could be used in the same fashion. The order could also be delivered to the consumer's home.

It will thus be seen that the objects set forth above, among those made apparent from the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. Apparatus to aid shopping by a consumer, comprising:
   (a) bar code reading means to read, at a location remote from a store, information representing items desired by said consumer;
   (b) portable memory means to receive and retain said information; and
   (c) terminal means located at said store to read said portable memory means, after temporary physical attachment of said portable memory means to said terminal means, to compile a list of said items and to provide said list to said consumer.

2. Apparatus to aid shopping by a consumer, as defined in claim 1, wherein said information is entered into said portable memory means by said consumer scanning bar codes.

3. Apparatus to aid shopping by a consumer, as defined in claim 2, wherein said bar codes are selected from the group consisting of bar codes on containers, bar codes in pamphlets, bar codes on advertisements, and bar codes on coupons.

4. Apparatus to aid shopping by a consumer, as defined in claim 1, wherein said terminal means provides a printed list of said items to said consumer.

5. Apparatus to aid shopping by a consumer, as defined in claim 1, wherein said terminal means further comprises a screen for viewing said list by said consumer.

6. Apparatus to aid shopping by a consumer, as defined in claim 1, wherein said list is compiled in a preferred shopping sequence.

7. Apparatus to aid shopping by a consumer, as defined in claim 1, wherein said list is transmitted to a warehouse for order picking.

8. A method of shopping by a consumer, comprising:
   (a) providing bar code reading means to read information representing items desired by said consumer at a location remote from a store;
   (b) providing portable memory means to receive and retain said information;
   (c) providing terminal means located at said store to read said portable memory means, after temporary physical attachment of said portable memory means to said terminal means, to compile a list of said items, and to provide a printed said list to said consumer;
   (d) reading bar codes with said bar code reading means, said bar codes representing items desired by said consumer;
   (e) transferring said stored information into said terminal means by physically temporarily attaching said portable memory means to said terminal means; and
   (f) said terminal means providing said printed list to said consumer.

9. A method of shopping by a consumer, as defined in claim 8, wherein said information is entered into said portable memory means by said consumer scanning bar codes.

10. A method of shopping by a consumer, as defined in claim 10, wherein said bar codes are selected from the group consisting of bar codes containers, bar codes in pamphlets, bar codes on advertisements, and bar codes on coupons.

11. A method of shopping by a consumer, as defined in claim 8, wherein said terminal means provides a printed list of said items.

12. A method of shopping by a consumer, as defined in claim 8, wherein said terminal means further comprises a screen for viewing said list.

13. A method of shopping by a consumer, as defined in claim 8, wherein said list is compiled in a preferred shopping sequence.

14. A method of shopping by a consumer, as defined in claim 8, wherein said list is transmitted to a warehouse for order picking.

15. An apparatus to aid shopping by a consumer, as defined in claim 1, wherein said portable memory means is an internal element of said bar code reading means and said bar code reading means is insertable in said 16. An apparatus to aid shopping by a consumer, as defined in claim 1, wherein said portable memory means is a smart card removable from said bar code reading means and insertable in said terminal means.

17. A method of shopping by a consumer, as defined in claim 8, wherein said portable memory means comprises a smart card and said stored information is transferred by means of temporarily inserting said smart card into said terminal means.

* * * * *